3,326,638
METHOD OF PREPARING XENON FLUORIDES BY FLUORINATING XENON WITH DINITROGEN DIFLUORIDE
Charles Spencer Cleaver, Delwyn, Wilmington, Del., assignor to E. I. du Pont de Nemours and Company, Wilmington, Del., a corporation of Delaware
No Drawing. Filed Mar. 6, 1964, Ser. No. 350,102
3 Claims. (Cl. 23—205)

This invention relates to an improved method for preparing xenon fluorides.

The preparation and characterization of the fluorides of the rare gases has been achieved only recently. Methods for the preparation of krypton tetrafluoride, xenon di-, tetra-, and hexafluoride, as well as a radon fluoride are available in the art.

The three known xenon fluorides can be synthesized from the elements and are white solids at room temperature. With the exception of a method involving the pyrolysis (above 160° C.) of xenon hexafluoroplatinate, which produces xenon tetrafluoride in poor yield, all the known methods for preparing the xenon fluorides employ the direct combination of xenon and elemental fluoride under varying conditions.

Xenon difluoride and xenon tetrafluoride can be prepared by combining one part, by volume, of xenon with five parts of fluorine at 400° C. and pressures ranging from one to five atmospheres (Claasen et al., Journal of the American Chemical Society, 84, 3593 (1962)). Xenon hexafluoride has been prepared by interacting xenon with an excess of fluorine at 300° C. to 450° C. and pressures of 60 to 1000 atmospheres (Journal of the American Chemical Society, 85, 110–112 (1963)). An improvement over the thermal method of Claasen et al. comprises the quantitative and continuous combination of xenon and fluorine at —78° C. in the presence of an electric discharge. Although this method avoids the use of excess quantities of fluorine and can be carried out in the absence of the high temperatures employed in the thermal method, it nevertheless requires the input of external energy, which in this case is supplied by the electric discharge.

This invention has as an object the preparation of xenon fluorides. A particular object of the present invention is to provide an improved thermal method of preparing xenon fluorides.

These and other objects of the present invention are accomplished by heating a gaseous mixture of xenon and an excess of dinitrogen difluoride at temperatures below 200° C., and obtaining a solid mixture of substantially all xenon tetrafluoride combined with a small amount of xenon difluoride and xenon hexafluoride.

The process of the present invention is carried out under mild conditions and permits the use of simple equipment and materials of construction; moreover, the process affords high yields of the solid xenon fluorides.

Although xenon is the rare gas preferably employed in the process of this invention, radon can also be used to prepare a radon fluoride. The dinitrogen difluoride used in the present invention can be obtained commercially or readily prepared by heating $N_3F$ at 25° C. to 100° C. under reduced pressure.

The relative amounts of xenon and dinitrogen difluoride employed in the process of the present invention determine to some extent the relative amounts of the respective xenon fluorides in the product mixture. In most cases an excess of dinitrogen difluoride is employed, with a greater proportion of the higher xenon fluorides being obtained in the solid product mixture when larger amounts of dinitrogen difluoride are used. The minimum amount of dinitrogen difluoride employed is usually in excess of two moles per mole of xenon.

The interaction between xenon and dinitrogen difluoride, according to the present invention, is carried out at temperatures of 60° C. to 200° C. with a range of 80° C. to 150° C. being preferred. It is unnecessary to observe any critical pressure limitations for the successful operation of the process of the present invention and reaction at atmospheric pressure is preferred, although sub- and superatmospheric pressures may be employed.

As a rule, the reaction is permitted to proceed for at least 0.5 hour. In general, no advantage is gained by operating for reaction times beyond 24 hours, although longer times may be employed. On completion of the reaction, one method of isolating the products of the reaction is by cooling the reactor, usually to liquid nitrogen temperatures (—196° C.), and removing the volatile contents by exhaustion. The reactor can then be warmed and then recooled, i.e., from —196° C. to room temperature and thence to Dry Ice temperatures (—78° C.). The volatile contents at —78° C. can then be removed by exhaustion. This cycle may be repeated several times in order to insure removal of all by-product gaseous material.

The white solid remaining after the removal of all the gaseous by-products comprises one or more of the xenon fluorides. These compounds are readily identifiable by mass spectrographic analysis, fluorine analysis, and by their reactivity with various substances. For example, the xenon fluorides react vigorously with acetone and ethanol with the evolution of sufficient heat to bring about ignition of the acetone and alcohol. On contact with water, gas evolution occurs, and an orange solution remains.

The following example illustrates the new process but is not to be construed as limiting the scope of the invention.

*Example*

One hundred ml. of gaseous xenon was mixed with 300 ml. of gaseous nitrogen difluoride, $N_2F_2$, in a 300 ml. monel (nickel, copper, iron alloy) cylinder, and the mixture heated for 24 hours at 90° C. to 100° C. on a steam bath. Initially, the internal pressure was 5 lb./sq. in. at 25° C. and at the end of the 24 hour reaction period it was 14 lb./sq. in. at 25° C. The reactor was cooled to —196° C. and the part of the contents which was volatile at this temperature was removed by exhaustion. Thereafter, the reactor was allowed to warm to 25° C., then cooled to —78° C., and the part of the contents which was volatile at this temperature was removed by exhaustion. The white mass which remained in the reactor was collected in a glass trap and identified as a mixture of xenon di-, tetra-, and hexafluoride by mass spectoroscopy. The xenon hexafluoride, which constituted only a minor portion of the mixture, was found to react vigorously with glass leaving a mass of substantially xenon tetrafluoride. The xenon tetrafluoride was sublimed and stable at room temperature.

As indicated above, the process of the present invention provides an improved thermal method for the preparation of xenon fluorides that is operative under mild conditions, i.e., temperatures below 200° C. and at atmospheric pressure. Thus, the need for elaborate equipment and expensive materials of construction is obviated.

The xenon fluorides are useful as initiators for the polymerization of olefinically unsaturated compounds. The use of the xenon fluorides as polymerization initiators is described in copending United States application Serial No. 350,120, filed Mar. 6, 1964. The xenon fluorides are also useful as fluorinating agents, oxidizing agents, crosslinking or curing agents for various resins, and as an explosive when contacted with various organic materials.

I claim:

1. A process for the preparation of xenon fluorides comprising the steps of admixing gaseous xenon with gaseous dinitrogen difluoride present in a molar ratio to the gaseous xenon of at least about 2:1 at temperature in the range of 60° C. to 200° C.

2. A process for the preparation of xenon tetrafluoride comprising the steps of admixing gaseous xenon with dinitrogen difluoride present in a molar ratio to the gaseous xenon of at least about 2:1 at a temperature in the range of 80° C. to 150° C. and recovering solid xenon tetrafluoride by removing volatiles from the reaction mixture under reduced pressure at temperatures in the range of −196° C. to −78° C.

3. A process for the preparation of xenon tetrafluoride comprising the steps of admixing gaseous xenon with dinitrogen difluoride present in a molar ratio to the gaseous xenon of at least about 2:1 at a temperature in the range of 80° C. to 150° C. under about atmospheric pressure and recovering solid xenon tetrafluoride by removing volatiles from the reaction mixture under reduced pressure at temperatures in the range of −196° C. to −78° C.

References Cited

UNITED STATES PATENTS

| 2,709,186 | 5/1955 | Farlow et al. | 204—169 |
| 2,963,468 | 12/1960 | Cleaver | 260—79.3 |
| 3,043,662 | 7/1962 | Lipscomb et al. | 23—205 |

OTHER REFERENCES

Claasen et al.: J.A.C.S., 85, p. 3593 et seq. (1962)
Milligan et al. J.A.C.S., 85, p. 823 (1963).
Pankratov, Russian Chemical Reviews, 32, p. 164 (1963).

OSCAR R. VERTIZ, *Primary Examiner.*

J. J. BROWN, *Assistant Examiner.*